United States Patent
Kitagawa

(10) Patent No.: US 11,760,932 B2
(45) Date of Patent: Sep. 19, 2023

(54) LIQUID CRYSTAL POLYMER FILM AND LAMINATE

(71) Applicant: FUJIFILM Corporation, Tokyo (JP)

(72) Inventor: Hirotaka Kitagawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/857,042

(22) Filed: Jul. 4, 2022

(65) Prior Publication Data

US 2023/0041602 A1 Feb. 9, 2023

(30) Foreign Application Priority Data

Jul. 15, 2021 (JP) ................. 2021-116968

(51) Int. Cl.
*G02F 1/1333* (2006.01)
*C09K 19/38* (2006.01)
*C09K 19/52* (2006.01)

(52) U.S. Cl.
CPC .......... *C09K 19/3809* (2013.01); *C09K 19/52* (2013.01)

(58) Field of Classification Search
CPC ............ C09K 19/3809; C09K 19/3804; C09K 19/52; C09K 19/38; C09K 2019/0444; C09K 2019/0448
See application file for complete search history.

(56) References Cited

U.S. PATENT DOCUMENTS 11,365,353 B2 * 6/2022 Nishi et al. ........ C09K 19/3809

FOREIGN PATENT DOCUMENTS

| JP | 2006299254 | | 11/2006 | |
| JP | 6729718 | B2 * | 7/2020 | ................ C08J 5/18 |
| WO | WO 2017/175649 | A1 * | 10/2017 | ................ H05K 1/03 |
| WO | WO 2022/114159 | A1 * | 6/2022 | ................ C08J 5/18 |

OTHER PUBLICATIONS

Machine Translation of WO 2017/175649 A1 (Year: 2023).*

* cited by examiner

*Primary Examiner* — Geraldina Visconti
(74) *Attorney, Agent, or Firm* — JCIPRNET

(57) ABSTRACT

An object of the present invention is to provide a liquid crystal polymer film having a low dielectric loss tangent. In addition, an object of the present invention is to provide a laminate having the liquid crystal polymer film.
The liquid crystal polymer film includes a liquid crystal polymer and a filler, in which, in a case where the liquid crystal polymer film includes one kind of the filler, a dielectric loss tangent of the filler under conditions of 25° C. and a frequency of 10 GHz is 0.0020 or less, and in a case where the liquid crystal polymer film includes two or more kinds of the fillers, a mass average value of dielectric loss tangents of the two or more kinds of the fillers under the conditions of 25° C. and a frequency of 10 GHz is 0.0020 or less, and a ratio of a volume occupied by the filler is 10% by volume or more with respect to a total volume of the liquid crystal polymer film.

13 Claims, No Drawings

LIQUID CRYSTAL POLYMER FILM AND LAMINATE

CROSS-REFERENCE TO RELATED APPLICATIONS

The present application claims priority under 35 U.S.C. § 119 to Japanese Patent Application No. 2021-116968 filed on Jul. 15, 2021. The above application is hereby expressly incorporated by reference, in its entirety, into the present application.

BACKGROUND OF THE INVENTION

1. Field of the Invention

The present disclosure relates to a liquid crystal polymer film and a laminate.

2. Description of the Related Art

Higher frequencies and wider bands than ever before have been used in a 5th generation (5G) mobile communication system, which is considered to be next-generation communication technology. Therefore, as a substrate film for a circuit board for the 5G mobile communication system, a film having low dielectric constant and low dielectric loss tangent characteristics is required, and development using various materials is in progress. One of such substrate films is a liquid crystal polymer film. The liquid crystal polymer (LCP) film has a lower dielectric constant and lower dielectric loss tangent than films used in 4th generation (4G) mobile communication systems, such as a polyimide film and a glass epoxy film.

For example, JP2006-299254A discloses a film consisting of a liquid crystalline resin composition obtained by formulating a liquid crystalline polyester composed of a specific structural unit with a spherical silica in which an average particle diameter and a coarse grain content are specified and which has a silanol group present on the surface thereof.

SUMMARY OF THE INVENTION

As described above, as a processing speed is increased, further improvement in dielectric characteristics (for example, dielectric loss) of the liquid crystal polymer film used for the circuit board has been required.

The present invention has been made in view of the above-described circumstances, and an object of the present invention is to provide a liquid crystal polymer film having a low dielectric loss tangent.

Another object of the present invention is to provide a laminate having the liquid crystal polymer film.

The inventors of the present invention have conducted intensive studies to solve the above-described problems, and as a result, have found that the above-described problems can be solved by the following configurations.

1 A liquid crystal polymer film comprising:
a liquid crystal polymer; and
a filler,
in which, in a case where the liquid crystal polymer film includes one kind of the filler, a dielectric loss tangent of the filler under conditions of 25'C and a frequency of 10 GHz is 0.0020 or less, and in a case where the liquid crystal polymer film includes two or more kinds of the fillers, a mass average value of dielectric loss tangents of the two or more kinds of the fillers under the conditions of 25° C. and a frequency of 10 GHz is 0.0020 or less, and a ratio of a volume occupied by the filler is 10% by volume or more with respect to a total volume of the liquid crystal polymer film.

2 The liquid crystal polymer film according to [1],
in which the ratio of the volume occupied by the filler is 30% to 60% by volume with respect to the total volume of the liquid crystal polymer film.

3 The liquid crystal polymer film according, to [1] or [2],
in which an X-ray diffraction intensity ratio measured by a method 1 described later is 1.07 or less.

4 The liquid crystal polymer film according to any one of [1] to [3],
in which the liquid crystal polymer film does not crack in a case where the liquid crystal polymer film is subjected to a bending test by a cylindrical mandrel method using a cylindrical mandrel having a diameter of 8 mm.

5 The liquid crystal polymer film according to any one of [1] to [4],
in which a thickness of the liquid crystal polymer film is 20 to 200 μm.

6 The liquid crystal polymer film according to any one of [1] to [5],
in which, in a case where the liquid crystal polymer film includes one kind of the filler, the dielectric loss tangent of the filler under the conditions of 25° C. and a frequency of 10 GHz is lower than a dielectric loss tangent of the liquid crystal polymer under the conditions of 25° C. and a frequency of 10 and in a case where the liquid crystal polymer film includes two or more kinds of the fillers, the mass average value of dielectric loss tangents of the two or more kinds of the fillers under the conditions of 25° C. and a frequency of 10 GHz is lower than the dielectric loss tangent of the liquid crystal polymer under the conditions of 25° C. and a frequency of 10 GHz.

7 The liquid crystal polymer film according to any one of [1] to [6],
in which a median diameter of the filler is 0.1 to 10 μm.

8 The liquid crystal polymer film according to any one of [1] to [7],
in which a shape of the filler is spherical or polyhedral, and
a sphericity of the filler is 0.90 or more.

9 The liquid crystal polymer film according to any one of [1] to [8],
in which the filler is inorganic oxide particles or inorganic nitride particles.

10 The liquid crystal polymer film according to any one of [1] to [9],
in which the filler is a filler surface-treated with a silane coupling agent.

11 The liquid crystal polymer film according to any one of [1] to [10],
in which, in a volume-based particle size distribution of the filler included in the liquid crystal polymer film, two or more peaks having different particle sizes are exhibited.

12 The liquid crystal polymer film according to any one of [1] to [11],
in which a dielectric loss tangent of the liquid crystal polymer under the conditions of 25° C. and a frequency of 10 GI-17, is 0.003 or less.

13 A laminate comprising:
the liquid crystal polymer film according to any one of [1] to [12]; and
a metal foil.

According to the present invention, it is possible to provide a liquid crystal polymer film having a low dielectric loss tangent. According to the present invention, it is possible to provide a laminate having the liquid crystal polymer film.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

In notations for a group (atomic group) in the present specification, in a case where the group is cited without specifying whether it is substituted or unsubstituted, the group includes both a group having no substituent and a group having a substituent as long as this does not impair the spirit of the present invention. For example, an "alkyl group" includes not only an alkyl group having no substituent (unsubstituted alkyl group), but also an alkyl group having a substituent (substituted alkyl group). In addition, an "organic group" in the present specification refers to a group including at least 1 carbon atom.

In the present specification, in a case where the liquid crystal polymer film has an elongated shape, a width direction of the liquid crystal polymer film means a lateral direction and a transverse direction (ID), and a length direction means a longitudinal direction and a machine direction (MD) of the liquid crystal polymer film.

In the present specification, for each component, one kind of substance corresponding to each component may be used alone, or two or more kinds thereof may be used in combination. Here, in a case where two or more kinds of substances are used in combination for each component, the content of the component indicates the total content of two or more substances, unless otherwise specified.

In the present specification, "to" is used to mean that numerical values described before and after "to" are included as a lower limit value and an upper limit value, respectively.

In the present specification, a dielectric loss tangent of the liquid crystal polymer film and a dielectric loss tangent of each component included in the liquid crystal polymer film are both dielectric loss tangent under conditions of 25° C. and a frequency of 10 GHz. Hereinafter, in the present specification, the dielectric loss tangent under the conditions of 25° C. and a frequency of 10 GHz is also simply referred to as a "dielectric loss tangent".

A liquid crystal polymer film according to an embodiment of the present invention is a liquid crystal polymer film including a liquid crystal polymer and a filler having a predetermined dielectric loss tangent, in which a ratio of a volume occupied by the filler is 10% by volume or more with respect to a total volume of the liquid crystal polymer film.

Hereinafter, in the liquid crystal polymer film, more excellent dielectric loss tangent is also referred to as that "the effect of the present invention is more excellent".

Component

First, the components of the liquid crystal polymer film according to the embodiment of the present invention will be described.

Liquid Crystal Polymer

The liquid crystal polymer film according to the embodiment of the present invention includes a liquid crystal polymer.

The liquid crystal polymer is preferably a melt-moldable liquid crystal polymer.

The liquid crystal polymer is preferably a thermotropic liquid crystal polymer. The thermotropic liquid crystal polymer means a polymer which exhibits liquid crystallinity in a predetermined temperature range.

The thermotropic liquid crystal polymer is not particularly limited as long as it is a melt-moldable liquid crystal polymer, and examples thereof include a thermoplastic liquid crystal polyester and a thermoplastic polyester amide with an amide bond introduced into the thermoplastic liquid crystal polyester.

As the liquid crystal polymer, for example, a thermoplastic liquid crystal polymer described in WO2015/064437A can be used.

From the viewpoint that the effect of the present invention is more excellent, a dielectric loss tangent of the liquid crystal polymer is preferably 0.004 or less, more preferably 0.003 or less, and still more preferably 0.0025 or less.

The lower limit value is not particularly limited, and may be, for example, 0.0001 or more.

In the present specification, a notation "dielectric loss tangent" with regard to the liquid crystal polymer is used to include, in a case where the liquid crystal polymer film includes two or more kinds of liquid crystal polymers, a "mass average value of dielectric loss tangents of the two or more kinds of the liquid crystal polymers".

The dielectric loss tangent of the liquid crystal polymer included in the liquid crystal polymer film can be measured by the following method.

First, after the liquid crystal polymer film is immersed in an organic solvent (for example, pentafluorophenol) 1000 times by mass with respect to the total mass of the liquid crystal polymer film, an organic solvent-soluble component including the liquid crystal polymer is elute in the organic solvent by heating at 120° C. for 12 hours. Next, the ciliate including the liquid crystal polymer and the non-eluting component (filler and the like) are separated by filtration. Subsequently, acetone is added to the eluate as a poor solvent to precipitate the liquid crystal polymer, and the precipitate is separated by filtration.

A polytetrafluoroethylene (PTFE) tube (outer diameter; 2.5 mm, inner diameter: 1.5 mm, length: 10 mm) is filled with the obtained precipitate, dielectric characteristics are measured by a cavity resonator perturbation method using a cavity resonator (for example, "CP-531" manufactured by KANTO Electronic Application and Development Inc.) under the conditions of a temperature of 25° C. and a frequency of 10 GHz, and by correcting the influence of voids in the PUT tube with Bruggeman equation and the void ratio, the dielectric loss tangent of the liquid crystal polymer is obtained.

In a case where a commercially available product of the liquid crystal polymer is used, the value of the dielectric loss tangent described as the catalog value of the commercially available product may be used.

The above-described void ratio (volume fraction of voids in the tube) is calculated as follows. A volume of a space inside the tube is obtained from the inner diameter and length of the tube. Next, a weight of the tube before and after filling the precipitate is measured to determine the mass of the filled precipitate and then the volume of the filled precipitate is determined from the obtained mass and the specific gravity of the precipitate. The volume of the precipitate obtained above is divided by the volume of the space in the tube obtained above to calculate the filling rate and the void ratio.

As the liquid crystal polymer, 8 commercially available product may be used, and examples thereof include "LAPEROS" manufactured by Polyplastics Co., Ltd., "Vectra" manufactured by Celanese corporation, "UENO LCP" manufactured by UENO FINE CHEMICALS INDUSTRY, LTD., "SUMIKA SUPER LCP" manufactured by Sumitomo Chemical Company, "Xydar" manufactured by ENEOS Corporation, and "Siveras" manufactured by TORAY INDUSTRIES, INC.

Among, these, examples of a liquid crystal polymer in which the value of the dielectric loss tangent is within the above-described preferred range include "LAPEROS" manufactured by Polyplastics Co., Ltd.

A mass average molecular weight (Mw) of the liquid crystal polymer is not particularly limited, but from the viewpoint that the effect of the present invention is more excellent, is preferably 50,000 to 1,000,000 and more preferably 100,000 to 500,000.

In the present specification, the mass average molecular weight polystyrene equivalent value measured by gel permeation chromatography (GPC).

The measurement h GPC is performed using. HLC (registered trademark)-8320GPC (manufactured by Tosoh Corporation) as a measuring device, two columns of TSKgel (registered trademark) Super HM-H (manufactured by Tosoh Corporation, 6.0 mmID×15 cm), and pentafluorophenol (PFP)/chloroform=½ (mass ratio) as an eluent. In addition, as measurement conditions, a sample concentration is 0.03% by mass, a flow rate is 0.6 ml/min, sample injection amount is 20 μL, a measurement temperature is 40° C., and a refractive index (RI) detector is used.

The calibration curve is created using eight samples of "F-40", "F-20", "F4", "F1", "A-500", "A-2500", "A-1000", and "n-propylbenzene" which are "Standard Samples TSK standard, polystyrene" (manufactured by Tosoh Corporation).

The liquid crystal polymer may be used alone or in combination of two or more thereof.

A content of the liquid crystal polymer is not particularly limited, but from the viewpoint that the effect of the present invention is more excellent, the volume occupied by the liquid crystal polymer is preferably 90% by volume or less, more preferably 80% by volume or less, still more preferably 70% by volume or less, and particularly preferably 60% by volume or less with respect to the total volume of the liquid crystal polymer film.

In addition, from the viewpoint that flexibility of the liquid crystal polymer film is improved and occurrence of cracks and breakage can be suppressed after manufacturing, the volume occupied by the liquid crystal polymer is preferably 30% by volume or more, more preferably 40% by volume or more, and still more preferably 50% by volume or more with respect to the total volume of the liquid crystal polymer film.

Filler

The liquid crystal polymer film according to the embodiment of the present invention includes a filler, in the liquid crystal polymer film according to the embodiment of the present invention, in a ease where the liquid crystal polymer film includes one kind of the filler, a dielectric loss tangent of the filler is 0.0020 or less, and in a case where the liquid crystal polymer film includes two or more kinds of the fillers, a mass average value of dielectric loss tangents of the two or more kinds of the fillers is 0.0020 or less.

Hereinafter, unless otherwise specified, the notation "dielectric loss tangent" with regard to the filler is described as a generic term including the dielectric loss tangent of the tiller in a case where the liquid crystal polymer film includes one kind of the filler and the mass average value of dielectric loss tangents of the two or more kinds of the fillers in a case where the liquid crystal polymer film includes two or more kinds of the fillers.

A volume occupied by the filler (in a case where the liquid crystal polymer film includes two or more kinds of the fillers, the total volume occupied by each filler) is 10% by volume or more with respect to the total volume of the liquid crystal polymer film according to the embodiment of the present invention.

As described above, since the liquid crystal polymer film according to the embodiment of the present invention includes, in addition to the liquid crystal polymer, the filler having a dielectric loss tangent of 0.0020 or less in a predetermined content, the effect of the present invention that the dielectric loss tangent can be reduced is obtained.

From the viewpoint that the effect of the present invention is more excellent, the dielectric loss tangent of the filler is preferably 0.0016 or less and more preferably 0.0012 or less. The lower limit value of the dielectric loss tangent of the filler is not particularly limited, and may be 0.0001 or more.

As described above, the filler may be used alone or in combination of two or more thereof. In a case where the liquid crystal polymer film includes two or more kinds of the fillers, the dielectric loss tangent of each filler is preferably 0.0020 or less, more preferably 0.0016 or less, and still more preferably 0.0012 or less.

In addition, from the viewpoint that the effect of the present invention is more excellent, it is preferable that the dielectric loss tangent of the filler is lower than the dielectric loss tangent of the liquid crystal polymer, and it is more preferable that the dielectric loss tangent of the filler is 0.0005 or more lower than the dielectric loss tangent of the liquid crystal polymer.

The dielectric loss tangent of the filler included in the liquid crystal polymer film can be measured by the following method.

First, an organic solvent (for example, pentafluorophenol) is added to the liquid crystal polymer film 1000 times by mass with respect to the total mass of the liquid crystal polymer film, and then the mixture is heated at 120° C. for 12 hours to perform a step 1 of eluting an organic solvent-soluble component in the liquid crystal polymer film in the organic solvent. Next, by performing a step 2 of filtering the organic solvent including the eluate, the tiller included in the liquid crystal polymer film is obtained as a residue.

Next, the obtained filler is filled in a PUT tube, dielectric characteristics are measured by a cavity resonator perturbation method using a cavity resonator (for ex ample, "CP-531" manufactured by KANTO Electronic Application and Development Inc.) under the conditions of a temperature of 2.5° C. and a frequency of 10 GHz and by correcting the influence of voids with Bruggeman equation and the void ratio, the dielectric loss tangent of the filler is obtained.

In a case where a commercially available product of the filler is used, the value of the dielectric loss tangent described as the catalog value of the commercially available product may be used.

In the step 1, in order to promote dissolution of the soluble component in the liquid crystal polymer, a pulverized product obtained by pulverizing the liquid crystal polymer film may be immersed in the organic solvent. In addition, the step 1 is sufficiently performed Until the amount of the organic solvent-soluble component eluted in the organic solvent is constant.

The volume occupied by the filler (in a case where the liquid crystal polymer film includes two or more kinds of the fillers, the total volume occupied by each filler) (hereinafter, also referred to as a "filler volume fraction") is 10% by volume or more with respect to the total volume of the liquid crystal polymer film.

From the viewpoint that the dielectric loss tangent of the liquid crystal polymer film is more excellent, and viewpoint that in-plane anisotropy of the liquid crystal polymer is further lowered, the filler volume fraction is preferably 20% by volume or more, more preferably 30% by volume or more, and still more preferably 40% by volume or more. In addition from the viewpoint that flexibility of the liquid crystal polymer film is improved and occurrence of cracks and breakage can be suppressed after manufacturing, the filler volume fraction is preferably 60% by volume or less, more preferably 50% by volume or less, and still more preferably 40% by volume or less.

A type of the filler is not particularly limited, but inorganic particles are preferable.

Examples of an inorganic substance constituting the inorganic particles include oxides such as silica, alumina, magnesium oxide, and zirconia, and nitrides such as aluminum nitride and boron nitride. Examples of organic particles include crosslinked styrene particles and PTFE particles.

As the filler, inorganic oxide particles or inorganic nitride particles are preferable, silica particles, alumina particles, or boron nitride particles are more preferable, and silica particles are still more preferable. Among the silica particles, crystallized silica particles or molten silica particles are preferable. From the viewpoint of reducing the dielectric loss tangent, crystallized silica particles are more preferable. From the viewpoint of reducing thermal expansion factor, molten silica particles are more preferable.

A surface of the filler may be coated. Examples of a surface treatment agent for the filler include a silane coupling agent.

Among these, from the viewpoint that dispersibility of the filler is improved and flexibility of the liquid crystal polymer film is improved, a filler surface treated with a silane coupling agent is preferable. That is, it is preferable that at least a part of the surface of the filler is formed with a coating layer including at least one selected from the group consisting of a silane coupling agent (organosilane compound), a partial hydrolysate thereof, and a condensate thereof.

A particle size of the filler is not particularly limited, but a median diameter ($D_{50}$) of the filler is preferably 0.1 to 50 µm, more preferably 0.1 to 10 µm, and still more preferably 0.5 to 6 µm.

The median diameter ($D_{50}$) of the filler included in the liquid crystal polymer film can be measured with a scanning electron microscope (SEM).

Cross sections perpendicular to the film surface are made at 10 different sites of the liquid crystal polymer film sample. The obtained cross section is observed with the SEM at an appropriate magnification of 100 to 100000 times to Obtain an observation image. 100 fillers are randomly selected from the obtained observation image, and the outer circumference of each filler is traced. The particle size of the filler is calculated from these trace images by, an image analyzer, and then the median diameter ($D_{50}$) of the filler is obtained by determining a particle size at which the total volume is equal on the large diameter side and the small diameter side in a volume-based particle size distribution created from the particle size.

In a case where a commercially available product of the filler is used, the value of the median diameter ($D_{50}$) described as the catalog value of the commercially available product may be used.

It is preferable that, in the particle size distribution, the filler included in the liquid crystal polymer film has two or more peaks having different particle sizes. In other words, it is preferable that the liquid crystal polymer film includes two or more fillers having different particle sizes. This is because the liquid crystal polymer film includes two or more fillers having different particle sizes, so that filling property of the filler is improved and the effect of the present invention is further improved.

Whether or not the liquid crystal polymer film includes two or more kinds of fillers having different particle sizes can be confirmed by whether or not two or more peaks having different particle sizes appear in the particle size distribution measured by the above-described measuring method. In a case where two or more peaks having different particle sizes appear in the particle size distribution measured by, the above-described measuring method, the particle size distribution indicates that a filler having a particle size corresponding to each peak is formulated in the liquid crystal polymer film.

In a case where the liquid crystal polymer film includes two or more kinds of fillers having different particle sizes and two or more peaks having different particle sizes appear in the particle size distribution, the particle size of each filler can be obtained by calculating the median diameter ($D_{50}$) from the particle size distribution separated from each peak.

In addition, in a case where a manufacturing method of the liquid crystal polymer film is known and a commercially available product is used for each of two or more fillers having different particle sizes, the catalog values of those commercially available products may be used as the median diameter ($D_{50}$) of each filler.

In a case where the liquid crystal polymer film includes two or more fillers having different particle sizes, as a filler having a smaller particle size, it is preferable to include at least a filler having a median diameter ($D_{50}$) of 1 µm or less, and it is more preferable to include at least a filler having a median diameter ($D_{50}$) of 0.5 µm or less. The lower limit value thereof is not particularly limited, but from the viewpoint of dispersibility, 0.1 µm or more is preferable.

In addition, in a case where the liquid crystal polymer film includes two or more fillers having different particle sizes, as a filler having a larger particle size, it is preferable to include at least a tiller having a median diameter ($D_{50}$) of 2 µm or more, and it is more preferable to include at least a filler having a median diameter ($D_{50}$) of 5 µm or more. The upper limit value thereof is not particularly limited, but 50 µm or less is preferable.

That is, in a case where the liquid crystal polymer film includes two or more fillers having different particle sizes, it is preferable to include a combination of a filler having a median diameter of 1 µm or less (more preferably 0.5 µm or less) and a filler having a median diameter of 2. µm or more (more preferably 5 µm or more).

A shape of the filler is not particularly limited, and may be spherical, ellipsoidal, polyhedral, scaly, or irregular.

From the viewpoint that the effect of the present invention is more excellent, the shape of the filler is preferably spherical or polyhedral.

From the viewpoint that dispersibility is improved and the effect of the present invention is more excellent, a sphericity of the filler is preferably 0.90 or more and more preferably 0.94 or more. The upper limit value is not particularly limited, and may be 1.0 or less.

Among these, a filler which is spherical or polyhedral and has a sphericity of 0.90 or more is preferable, and a filler Which is spherical or polyhedral and has a sphericity of 0.94 or more is more preferable.

The sphericity of the filler can be calculated from the SEM observation image of the cross section of the liquid crystal polymer film. Specifically, a projected area (A) and a peripheral length (M) of the filler particles are measured from the cross-sectional SEM image. Assuming a true sphere having the peripheral length (M), a radius (r) thereof is $M/2\pi$, and an assumed area (B) of the true sphere is $\pi \times (M/2\pi)$. The sphericity is calculated from the projected area (A) and the assumed area (B) of the true sphere as $A/B = 4\pi \times A/M^2$. An average value of the sphericity of random 100 filler particles can be adopted as the sphericity of the filler.

In a case where a commercially available product is used as the Eller, the catalog value of the commercially available product may be used as the sphericity of the filler.

Optional Component

The liquid crystal polymer film may include an additive other than the liquid crystal polymer and the filler as an optional component. Examples of the additive include a plasticizer, a lubricant, and a heat stabilizer.

Examples of the plasticizer include a bisphenol compound (bisphenol A and bisphenol F), an alkylphthalylalkyl glycolate compound, a phosphoric acid ester compound, and a carboxylic acid ester compound. A content of the plasticizer is preferably 0% to 5% by mass with respect to the total mass of the liquid crystal polymer film.

Examples of the lubricant include a fatty acid ester. A content of the lubricant is preferably 0% to 5% by mass with respect to the total mass of the liquid crystal polymer film.

The heat stabilizer can be selected from phenol-based stabilizers and amine-based stabilizers having a radical scavenging action; phosphite-based stabilizers and sulfur-based stabilizers having a decomposition action of peroxide; and hybrid stabilizers having a radical scavenging action and a decomposition action of peroxide. A content of the heat stabilizer is preferably 0% to 5% by mass with respect to the total mass of the liquid crystal polymer film.

Characteristics of Liquid Crystal Polymer Film

Hereinafter, characteristics of the liquid crystal polymer film will be described.

Thickness

A thickness of the liquid crystal polymer film is preferably 10 to 300 μm, more preferably 20 to 200 μm, and still more preferably 50 to 150 μm.

X-Ray Diffraction Intensity Ratio

The liquid crystal polymer film preferably has a low X-ray diffraction intensity ratio $(I_1/I_0)$ measured by the following method. Specifically, the X-ray diffraction intensity ratio $(I_1/I_0)$ measured by the following method is preferably 1.10 or less, more preferably 1.07 or less, and still more preferably 1.05 or less. The lower limit value is not particularly limited, and may be 1.00.

A measuring method of the X-ray diffraction intensity ratio $(I_1/I_0)$ which shows in-plane anisotropy of the X-ray diffraction intensity in the liquid crystal polymer film will be described.

Using an X-ray diffractometer, X-rays are incident on the surface of the liquid crystal polymer film, and the X-ray diffraction intensity of $2\theta = 19°$ is measured. The X-ray diffraction intensity is measured while rotating the liquid crystal polymer film with a normal direction of the surface of the film as a rotation axis (β axis), the minimum value $(I_0)$ and the maximum value $(I_1)$ of the X-ray diffraction intensity are obtained from a measurement result obtained by a 360° rotation, and the X-ray diffraction intensity ratio $(I_1/I_0)$ is calculated from a ratio of the maximum value $(I_1)$ to the minimum value $(I_0)$. The X-ray diffraction intensity ratio $(I_1/I_0)$ calculated in this way represents a degree of alignment anisotropy of the liquid crystal polymer on the surface of the liquid crystal polymer film.

Since the liquid crystal polymer has a rod-like molecular structure, aligning properties tend to be strong. Therefore, the liquid crystal polymer may be aligned in one direction in the liquid crystal polymer film, and the liquid crystal polymer may exhibit anisotropy (alignment anisotropy). On the other hand, in a case where the X-ray diffraction intensity ratio $(I_1/I_0)$ of the liquid crystal polymer film is within the above-described range, it is possible to suppress the alignment anisotropy of the liquid crystal polymer and suppress the in-plane anisotropy of the dielectric characteristics and the thermal expansion factor.

A manufacturing method of the liquid crystal polymer film in which the X-ray diffraction intensity ratio $(I_1/I_0)$ is within the above-described range and the alignment anisotropy of the liquid crystal polymer is low is not particularly limited, and examples thereof include a method of manufacturing the liquid crystal polymer film by melting a coating film of a dispersion liquid including liquid crystal polymer particles and the filler, which will be described later.

Flexibility

The liquid crystal polymer film according to the embodiment of the present invention has excellent flexibility. Therefore, even in a case where the liquid crystal polymer film according to the embodiment of the present invention is subjected to a bending test by a cylindrical mandrel method using a cylindrical mandrel having a diameter of 16 min in accordance with a method described in JIS K 5600-5-1, cracks do not occur.

In the liquid crystal polymer film, the cylindrical mandrel which does not crack even in a case of being subjected to the above-described bending test is preferably a cylindrical mandrel having a diameter of 8 mm, more preferably a cylindrical mandrel having a diameter of 4 mm, and still more preferably a cylindrical mandrel having a diameter of 2 mm.

Dielectric Characteristics

The liquid crystal polymer film according to the embodiment of the present invention has excellent dielectric characteristics. Specifically, the dielectric loss tangent of the liquid crystal polymer film is preferably 0.0025 or less and more preferably 0.002 or less. It is still more preferable to be 0.0015 or less. The lower limit value is not particularly limited, and may be 0.0001 or more.

In addition, a specific dielectric constant of the liquid crystal polymer film varies depending on its use, hut is preferably 2.0 to 4.0 and more preferably 2.5 to 3.5.

The dielectric characteristics including the dielectric loss tangent and die specific dielectric constant of the liquid crystal polymer film can be measured by connecting a 10 GHz cavity resonator (CP-531 of KANTO Electronic Application and Development Inc.) to a network analyzer ("E836313" manufactured by Agilent Technologies, Inc.), inserting a liquid crystal polymer film (width: 2.0 mm×length: 80 mm) cut into a striped shape into the cavity resonator, and performing a cavity resonator perturbation method under the conditions of a temperature of 25° C. and a frequency of 10 GHz, Manufacturing Method of Liquid. Crystal Polymer Film A manufacturing method of the liquid crystal polymer film is not particularly limited, and examples thereof include a method (casting method) of forming a coating film using a coating liquid including each of the above-described components, and drying and heating the coating film to produce the above-described liquid crystal polymer film, and a method of extruding a molten product (melt) obtained by melting each of the above-described components into a film using a T-die or an extruder to form a film. The above-described casting method is preferable because it is easy to produce a liquid crystal polymer film having a low alignment anisotropy of the liquid crystal polymer.

Hereinafter, the manufacturing method of the liquid crystal polymer film will be described by taking as an example the casting method using a coating liquid described above. In the following description, the liquid crystal polymer film may be simply referred to as a "film".

The casting method includes, for example a step A of preparing a coating liquid including a liquid crystal polymer, a filler, and a solvent, a step B of applying the coating liquid to a substrate to form a coating film, and a step C of removing the solvent from the coating film. In addition, the casting method may further include, after the step C or together with the step C, a step D of melting the liquid crystal polymer included in the coating film.

Step A

In the step A, a coating liquid including a liquid crystal polymer, a filler, and a solvent is prepared. In the coating liquid, the liquid crystal polymer may be dispersed in the solvent, or a part or all of the liquid crystal polymer may be dissolved in the solvent. In a case where at least a part of the liquid crystal polymer is dispersed in the coating liquid, from the viewpoint that a liquid crystal polymer film having a more uniform composition can be manufactured, it is preferable to perform the step D described later.

The Solvent is Preferably an Organic Solvent.

The organic solvent is not particularly limited, and examples thereof include alcohol-based ester-based, ketone-based, amide-based, or aromatic hydrocarbon-based organic solvents having a boiling point of 60° C. to 250° C. Among these, the organic solvent is appropriately selected in consideration of solubility or dispersibility of the liquid crystal polymer and the filler. In addition, the organic solvent may be a mixed solvent Obtained by mixing two or more kinds of these solvents.

A shape of the liquid crystal polymer used in the step A is not particularly limited, but in a case of preparing the coating liquid in which the liquid crystal polymer is dispersed, it is preferable to use a particulate liquid crystal polymer (liquid crystal polymer particles).

A shape of the liquid crystal polymer particles is preferably spherical. A median diameter ($D_{50}$) of the liquid crystal polymer particles is preferably 0.1 to 20 μm and more preferably 1 to 10 μm. The median diameter of the liquid crystal polymer particles is measured by a laser diffraction/light scattering method with Microtrac MT3300EXII (manufactured by Nikkiso Co., Ltd.).

In the step A, the order in which the liquid crystal polymer, the filler, the solvent, and optional additive are mixed is not particularly limited.

In the step A, in a ease where each component is mixed, a heating treatment may be performed within a range that does not affect characteristics of the liquid crystal polymer and the filler.

Step B

The step B is a step of applying the coating liquid prepared in the step A to a substrate to form a coating film.

As a method for applying the coating liquid, a known method can be adopted, and examples thereof include a roller coating method, a gravure coating method, a knife coating method, a blade coating method, a rod coating method, a dip coating method, a spray coating method, a curtain coating method, a slot coating method, and a screen printing method.

The substrate is not particularly limited as long as it has resistance to the liquid crystal polymer solution, but in a case where the film is used as a laminate described later, it is preferable to use a metal foil (more preferably, a copper foil) as the substrate.

Step C

The step C is a step of removing the solvent from the coating film (coating liquid layer) prepared in the step B.

A method for removing the solvent is not particularly limited, but it is preferable to evaporate the solvent by a method such as heating, depressurization, and ventilation. Among these, since production efficiency is good and operability is good, evaporation by heating is preferable, and it is more preferable to use both heating and ventilation.

As a heating method, known methods such as pressurized steam, heater heating, far-infrared irradiation, microwave heating, and a heat medium circulation heating method can be adopted.

Step D

From the viewpoint of improving film hardness of the film, it is preferable to perform, after the step C, the step D of melting the liquid crystal polymer included in the coating film.

The step D may be performed at the same time as the step C. That is, by heating the coating film, the liquid crystal polymer included in the coating film may be melted while removing the solvent from the coating film.

The heating temperature in the step D is appropriately adjusted by a melting point (Tm) of the liquid crystal polymer, but is preferably 280° C. to 400° C. and more preferably 320° C. to 400° C. Alternatively; the heating temperature in the step D is preferably in a temperature range higher than the melting point of the liquid crystal polymer as 0° C. to 80° C., and more preferably in a temperature range higher than the melting point of the liquid crystal polymer as 20° C. to 50° C.

The heating treatment time in the step D is appropriately adjusted depending on the type of each component, but is preferably 10 seconds to 60 minutes and more preferably 30 seconds to 20 minutes.

In addition, it is preferable that the step D is performed in an atmosphere of an inert gas such as nitrogen and argon.

The film with the substrate manufactured through the above-described steps A to D may be used as it is, or the film may be used alone after separating the substrate and the film. For example, the film with a metal foil may be immersed in an etchant and the metal foil may be removed by etching the film with a metal foil to manufacture a film having no substrate.

In addition, the film may be a single layer, or may have a laminated structure in which a plurality of layers having different compositions are laminated.

The manufactured film may be further subjected to a step of pressing the film with a heating roll to improve smoothness of the surface of the film.

Use of Liquid Crystal Polymer Film

Examples of the use of the liquid crystal polymer film include a film substrate, a laminate (flexible laminated board) formed by bonding with a metal foil, a flexible printed wiring board (ITC), and a laminated circuit board.

Among these, the above-described liquid crystal polymer film is preferably used for a substrate for high-speed communication having the liquid crystal polymer film.

Laminate

A laminate includes the liquid crystal polymer film and a metal foil. The metal foil is disposed on at least one side of the above-described liquid crystal polymer film. In this laminate, the liquid crystal polymer film constitutes an electrically insulating layer.

As a material used for the metal foil, a metal used for electrical connection is preferable. Examples of such a metal include copper, gold, silver, nickel, aluminum, and alloys including these metals. Examples of the alloy include a copper-zinc alloy, a copper-nickel alloy, and a zinc-nickel alloy. As the metal foil, copper or a copper alloy including 95% by mass or more of copper is preferable. As the copper foil, a copper foil manufactured by a rolling method or an electrolysis method can be used. In addition, the metal foil may be subjected to a chemical treatment such as pickling.

From the viewpoint of conductivity and economic efficiency of a wiring line, a thickness of the metal foil is preferably 4 to 100 μm and more preferably 10 to 35 μm.

As a method for manufacturing the laminate of the liquid crystal polymer film and the metal foil, a method of using the metal foil as a substrate in a case of manufacturing the liquid crystal polymer film by the above-described casting method is preferable. In addition, examples thereof also include a method of, after manufacturing the liquid crystal polymer film, directly forming a metal layer on one surface of the liquid crystal polymer film by a method such as vapor deposition, sputtering, and plating, and a method of laminating the metal foil on one surface of the liquid crystal polymer film and thermocompression-bonding the laminate using a vacuum press device.

EXAMPLES

Examples and Comparative Examples of the Present Invention Will be Described

Liquid crystal polymer films of Examples 1 to 13 and Comparative Examples 1 and 2 were manufactured by a manufacturing method shown below, and evaluated as follows. First, the manufacturing method of each liquid crystal polymer film of Examples and Comparative Examples will be described.

Raw Material

Raw materials used in manufacturing of a liquid crystal polymer film are shown below.

Dielectric loss tangents of spherical liquid crystal polymer particles and each filler were measured by a cavity resonator perturbation method using a cavity resonator (CP-531 manufactured by KANTO Electronic Application and Development Inc.) according to the above-described method under the conditions of a temperature of 25° C. and a frequency of 10 GHz.

Liquid Crystal Polymer

A liquid crystal polymer was produced by the following method.

After charging the following raw materials into a polymerization container, a temperature of the reaction system was increased to 140° C., and the reaction was carried out at 140° C. for 1 hour. Thereafter, the temperature was further increased to 330° C. over 3.5 hours, and then the pressure was reduced to 10 Torr (that is, 1330 Pa) over 15 minutes, whereby polycondensation was performed while distilling acetic acid, excess acetic anhydride, and other low-boiling components. After a stirring torque reached a predetermined value, nitrogen was introduced thereto to bring the system into a pressurized state from a reduced pressure state through a normal pressure state, and a polymer was discharged from a lower part of the polymerization container. The discharged strands were pelletized to obtain pellets of a liquid crystal polymer LCP1.

Raw Material

4-Hydroxybenzoic acid: 2524 g (79.3 mol %)

6-Hydroxy-2-naphthoic acid: 867 g (20 mol %)

Terephthalic acid (TA); 27 g (0.3 mol %)

Metal catalyst (potassium acetate catalyst): 150 mg

Acylating agent (acetic anhydride): 2336 g

The liquid crystal polymer LCP1 obtained in Production Example 1 described above was melt-kneaded with a polystyrene 1 (manufactured by PS Japan Corporation, "SCP10", glass transition temperature Tg: 100° C., melt viscosity: 27 Pa·s (cylinder temperature: 340° C., shear rate: 1000 sec-1)) using a twin-screw extruder at a cylinder temperature of 340° C. and a screw rotation speed of 125 rpm, so that a composition having a ratio of 900 parts by mass of the polystyrene 1 with respect to 100 parts by mass of the liquid crystal polymer LCP 1 was obtained. The composition was obtained as an extruded strand from a circular nozzle at a resin extrusion rate of 10 kg/hr, and cut to be pelletized.

100 g of the pellet of the obtained composition was put into 900 g of toluene heated to 40° C. in a 2 L flask, and the polystyrene was dissolved in toluene by stirring for 30 minutes. Insoluble components were recovered by suction filtration, and the insoluble components were additionally washed with 90 g of toluene at 40° C. The additional washing was performed 3 times. Insoluble components after the additional washing were filtered through a 1 μm filter, and the filtered product was collected and dried to Obtain fine particles of a liquid crystal polymer (A) (spherical liquid crystal polymer particles).

Filler

B-1; crystallized silica particles (m by NIPPON STEEL Chemical & Material Co., Ltd., spherical (sphericity: 0.98), median diameter ($D_{50}$): 10 μm, dielectric loss tangent: 0.0009)

B-2: molten silica particles ("ADMAFINE SC6500-SQ" manufactured by Admatechs., spherical (sphericity; 0.95), median diameter ($D_{50}$): 2 μm, dielectric loss tangent: 0.0011)

B-3: molten silica particles surface-treated with a silane coupling agent having a phenyl group ("ADMAFINE SC6500-SPD" manufactured by Admatechs., spherical (sphericity: 0.95), median diameter ($D_{50}$): 2 μm, dielectric loss tangent: 0.0012)

B-4: molten silica particles ("ADMAFINE SC2500-SQ" manufactured by Admatechs., spherical (sphericity; 0.95), median diameter ($D_{50}$): 0.6 μm, dielectric loss tangent: 0.0012)

B-5: alumina particles ("Sumicorundum AA-3" manufactured by Sumitomo Chemical Co., Ltd., polyhedral (sphericity: 0.91), median diameter ($D_{50}$): 3 μm, dielectric loss tangent: 0.0016)

B-6: boron nitride particles ("HP40MF100" manufactured by MIZUSHIMA FERROALLOY CO., LTD., amorphous particle, median diameter ($D_{50}$): 40 him, dielectric loss tangent: 0.0007)

Solvent

Cyclohexanone

Example 1

A liquid crystal polymer film was manufactured by a method shown below.

Preparation of Dispersion Liquid 28.0 g of the liquid crystal polymer (A), 46.0 g of the filler (B-1), and 57.0 g of cyclohexanone were mixed, and the obtained mixed solution was subjected to an ultrasonic dispersion treatment to prepare a dispersion liquid 1.

Manufacturing of Liquid Crystal Polymer Film

The dispersion liquid 1 was applied to a roughened surface of an electrolytic copper foil ("CF-T9A-DS-HD2R" manufactured by FUKUDA METAL FOIL & POWDER CO., LTD., thickness: 18 μm) for a flexible copper-clad laminate plate using an applicator having a clearance set to 300 him. Thereafter, the foil was heated and dried at 100° C. for 3 minutes to obtain a copper foil with a coating film of the dispersion liquid 1.

Subsequently, the copper foil with the coating, film was heated at 360° C. for 5 minutes in a nitrogen atmosphere to fuse and weld the particulate liquid crystal polymer included in the coating film. After the heating was completed, the copper foil was naturally cooled to room temperature to obtain a laminate consisting of the liquid crystal polymer film including the crystallized silica particles and the copper foil.

Further, the laminate was immersed in a 40% by mass iron (III) chloride aqueous solution (manufactured by Wako Pure Chemical Industries, Ltd.) for 6 hours to etch the copper foil, and then washed with water and dried, thereby obtaining a liquid crystal polymer film (thickness: 120 μm) including the crystallized silica particles. A ratio (filler volume fraction) of a volume occupied by filler B-1 was 50% by volume with respect to the total volume of the obtained liquid crystal polymer film.

Examples 2 to 13 and Comparative Examples 1 and 2

Dispersion liquids 2 to 1.5 were prepared by mixing the liquid crystal polymer, the filler, and the solvent so as to have the compositions shown in Tables 1 and 2 below, and performing an ultrasonic dispersion treatment to the Obtained mixed solution.

Filler-containing liquid crystal polymer films of Examples 2 to 13 were manufactured in the same manner as in Example 1, except that, the dispersion liquids 2 to 12 and 15 prepared above were used instead of the dispersion liquid 1, respectively.

In addition, liquid crystal polymer films of Comparative Examples 1 and 2 were manufactured in the same manner as in Example 1, except that, the dispersion liquids 13 and 14 prepared above were used instead of the dispersion liquid 1 respectively.

All thicknesses of the liquid crystal polymer films of Examples 2 to 13 and Comparative Examples 1 and 2 were 120 μm.

Tables 1 and 2 show compositions of the dispersion liquids 1 to 15.

In the tables below, the column of "Specific gravity [g/mL]" indicates a specific gravity (unit: g/mL) of the component described in the column of "Component".

TABLE 1

| | Component | | Specific gravity [g/mL] | Dispersion liquid 1 | Dispersion liquid 2 | Dispersion liquid 3 | Dispersion liquid 4 | Dispersion liquid 5 | Dispersion liquid 6 | Dispersion liquid 7 |
|---|---|---|---|---|---|---|---|---|---|---|
| Dispersion liquid composition [g] | Liquid crystal polymer (A) | | 1.4 | 28.0 | 22.4 | 33.6 | 39.2 | 44.8 | 50.4 | 28.0 |
| | Filler | B-1 | 2.3 | 46.0 | 55.2 | 36.8 | 27.6 | 18.4 | 9.2 | — |
| | | B-2 | 2.2 | — | — | — | — | — | — | 44.0 |
| | | B-3 | 2.2 | — | — | — | — | — | — | — |
| | | B-4 | 2.2 | — | — | — | — | — | — | — |
| | | B-5 | 4.0 | — | — | — | — | — | — | — |
| | | B-6 | 2.3 | — | — | — | — | — | — | — |
| | Solvent (cyclohexanone) | | 0.95 | 57.0 | 57.0 | 57.0 | 57.0 | 57.0 | 57.0 | 57.0 |

TABLE 2

| | Component | | Specific gravity [g/mL] | Dispersion liquid 8 | Dispersion liquid 9 | Dispersion liquid 10 | Dispersion liquid 11 | Dispersion liquid 12 | Dispersion liquid 13 | Dispersion Liquid 14 | Dispersion liquid 15 |
|---|---|---|---|---|---|---|---|---|---|---|---|
| Dispersion liquid composition [g] | Liquid crystal polymer (A) | | 1.4 | 28.0 | 28.0 | 28.0 | 28.0 | 28.0 | 56.0 | 53.8 | 16.8 |
| | Filler | B-1 | 2.3 | — | — | — | — | 27.6 | — | 3.7 | 64.4 |
| | | B-2 | 2.2 | — | — | — | — | 13.2 | — | — | — |
| | | B-3 | 2.2 | 44.0 | — | — | — | — | — | — | — |
| | | B-4 | 2.2 | — | 44.0 | — | — | 4.4 | — | — | — |

TABLE 2-continued

| Component | Specific gravity [g/mL] | Dispersion liquid 8 | Dispersion liquid 9 | Dispersion liquid 10 | Dispersion liquid 11 | Dispersion liquid 12 | Dispersion liquid 13 | Dispersion Liquid 14 | Dispersion liquid 15 |
|---|---|---|---|---|---|---|---|---|---|
| B-5 | 4.0 | — | — | 80.0 | — | — | — | — | — |
| B-6 | 2.3 | — | — | — | 46.0 | — | — | — | — |
| Solvent (cyclohexanone) | 0.95 | 57.0 | 57.0 | 57.0 | 57.0 | 57.0 | 57.0 | 57.0 | 57.0 |

Evaluation

The following characteristics were evaluated for each liquid crystal polymer film of Examples and Comparative Examples manufactured by the above-described method.

Dielectric Loss Tangent

A dielectric loss tangent of each liquid crystal polymer film was measured under the conditions of a temperature of 25° C. and a frequency of 10 GHz. The dielectric loss tangent was measured by a cavity resonator perturbation method using a cavity resonator (CP-531 manufactured by KANTO Electronic Application and Development Inc.) according to the above-described method.

X-Ray Diffraction Intensity Ratio

Using a wide-angle X-ray diffractometer, in-plane anisotropy of an X-ray diffraction intensity on a surface of each liquid crystal polymer film was measured. Specifically, X-rays were incident on a surface of the film, and the X-ray diffraction intensity of 2θ=19° was measured while rotating the liquid crystal polymer film with a normal direction of the surface of the film as a rotation axis (β axis). From the measurement data of the X-ray diffraction intensity obtained by a 360° rotation of the liquid crystal polymer film, a ratio $(I_1/I_0)$ of the maximum value $(I_1)$ of the X-ray diffraction intensity to the minimum value $(I_0)$ of the X-ray diffraction intensity was calculated.

The obtained X-ray diffraction intensity ratio $(I_1/I_0)$ represented the alignment anisotropy of the liquid crystal polymer on the surface of the liquid crystal polymer film.

Flexibility

A sample (5 cm×10 cm strips) of each liquid crystal polymer film of Examples and Comparative Examples was produced. Each sample obtained above was subjected to a bending test using a cylindrical mandrel bending tester (manufactured by Allgood) according to a method described in JIS K 5600-5-1, Using cylindrical mandrels with diameters of 32, 16, 8, 4, and 2 mm, in a case where the sample was wound along the mandrel, the presence or absence of cracks (breakage) in the sample was observed, flexibility of the liquid crystal polymer film was evaluated based on the following evaluation standard from the presence or absence of cracks and the diameter of the mandrel used in a case where the cracks occurred.

As the diameter of the mandrel used in a case where the cracks occurred is shorter, the flexibility of the liquid crystal polymer film is more excellent.

Evaluation Standard for Flexibility

A: cracks did not occur with the cylinder having a diameter of 2 min.

B: cracks occurred with the cylinder having a diameter of 2 mm, but cracks did not occur with the cylinder having a diameter of 4 mm.

C: cracks occurred with the cylinder having a diameter of 4 mm, but cracks did not occur with the cylinder having a diameter of 8 mm.

D: cracks occurred with the cylinder having a diameter of 8 mm, but cracks did not occur with the cylinder having a diameter of 16 mm.

E: cracks occurred with the cylinder having a diameter of 1.6 mm.

Features and evaluation results of each liquid crystal polymer film are shown in Table 3 below.

In the table, the column of "Dispersion liquid" indicates the dispersion liquid used, and the column of "Filler" indicates characteristics of the filler included in each dispersion liquid.

The column of "Filler volume fraction" indicates the ratio (unit:% by volume) of the volume occupied by the filler (in a case Where the liquid crystal polymer film includes two or more kinds of the fillers, the total volume occupied by, each filler) with respect to the total volume of each liquid crystal polymer film.

The column of "Dielectric loss tangent" indicates the measured value of the dielectric loss tangent of each liquid crystal polymer film measured by the above-described method.

The column of "X-ray diffraction intensity ratio $(I_1/I_0)$" indicates the calculation result of the X-ray diffraction intensity ratio $(I_1/I_0)$ of each liquid crystal polymer film measured by the above-described method.

The column of "Flexibility" indicates the flexibility of each liquid crystal polymer film evaluated by the above-described method.

TABLE 3

| Table 3 | Dispersion liquid | Filler Type | Filler Shape | Filler Median diameter [μm] | Filler Dielectric loss tangent | Liquid crystal polymer film Filler volume fraction [% by volume] | Liquid crystal polymer film Dielectric loss tangent | Liquid crystal polymer film X-ray diffraction intensity ratio $(I_1/I_0)$ | Flexibility |
|---|---|---|---|---|---|---|---|---|---|
| Example 1 | Dispersion liquid 1 | Crystallized silica | Spherical | 10 | 0.0009 | 50 | 0.0013 | 1.03 | C |
| Example 2 | Dispersion liquid 2 | Crystallized silica | Spherical | 10 | 0.0009 | 60 | 0.0012 | 1.03 | D |
| Example 3 | Dispersion liquid 3 | Crystallized silica | Spherical | 10 | 0.0009 | 40 | 0.0014 | 1.04 | B |
| Example 4 | Dispersion liquid 4 | Crystallized silica | Spherical | 10 | 0.0009 | 30 | 0.0016 | 1.05 | A |

TABLE 3-continued

| Table 3 | Dispersion liquid | Filler Type | Filler Shape | Filler Median diameter [μm] | Filler Dielectric loss tangent | Liquid crystal polymer film Filler volume fraction [% by volume] | Liquid crystal polymer film Dielectric loss tangent | Liquid crystal polymer film X-ray diffraction intensity ratio ($I_1/I_0$) | Flexibility |
|---|---|---|---|---|---|---|---|---|---|
| Example 5 | Dispersion liquid 5 | Crystallized silica | Spherical | 10 | 0.0009 | 20 | 0.0018 | 1.07 | A |
| Example 6 | Dispersion liquid 6 | Crystallized silica | Spherical | 10 | 0.0009 | 10 | 0.0020 | 1.07 | A |
| Example 7 | Dispersion liquid 7 | Molten silica | Spherical | 2 | 0.0011 | 50 | 0.0015 | 1.04 | B |
| Example 8 | Dispersion liquid 8 | Molten silica (surface-treated) | Spherical | 2 | 0.0012 | 50 | 0.0016 | 1.03 | A |
| Example 9 | Dispersion liquid 9 | Molten silica | Spherical | 0.6 | 0.0012 | 50 | 0.0015 | 1.02 | A |
| Example 10 | Dispersion liquid 10 | Crystallized silica | Spherical | 10 | 0.0009 | 50 | 0.0014 | 1.03 | A |
| | | Molten silica | Spherical | 2 | 0.0011 | | | | |
| | | Molten silica | Spherical | 0.6 | 0.0012 | | | | |
| Example 11 | Dispersion liquid 11 | Alumina | Polyhedral | 3 | 0.0016 | 50 | 0.0019 | 1.05 | B |
| Example 12 | Dispersion liquid 12 | Boron nitride | Amorphous | 40 | 0.0007 | 50 | 0.0014 | 1.06 | D |
| Example 13 | Dispersion liquid 15 | Crystallized silica | Spherical | 10 | 0.0009 | 70 | 0.0011 | 1.03 | E |
| Comparative Example 1 | Dispersion liquid 13 | — | — | — | — | 0 | 0.0021 | 1.08 | — |
| Comparative Example 2 | Dispersion liquid 14 | Crystallized silica | Spherical | 10 | 0.0009 | 4 | 0.0021 | 1.08 | — |

From the results shown in the above tables, it was confirmed that the liquid crystal polymer film according to the embodiment of the present invention can solve the problems of the present invention.

From the viewpoint that the dielectric loss tangent of the liquid crystal polymer film was more excellent, and viewpoint that the alignment anisotropy of the liquid crystal polymer was further lowered, it was confirmed that the filler volume fraction was preferably 20% by volume or more, more preferably 30% by volume or more, and still more preferably 40% by volume or more (comparison of Examples 1 to 6 and the like).

In addition, from the viewpoint that the flexibility of the liquid crystal polymer film was more excellent, it was confirmed that the filler volume fraction was preferably 60% by volume or less, more preferably 50% by volume or less, and still more preferably 40% by volume or less (comparison of Examples 1 to 6 and 13, and the like), From the viewpoint that the flexibility of the liquid crystal polymer film was more excellent, it was confirmed that the filler having a median diameter of 6 μm or less was more preferable (comparison of Examples 1 and 7 and the like).

In addition, from the viewpoint that the flexibility of the liquid crystal polymer film was more excellent, it was confirmed that the filler surface-treated with a silane coupling agent was more preferable (comparison of Examples 1 and 8 and the like).

In addition, from the viewpoint that the flexibility of the liquid crystal polymer film was more excellent, it was confirmed that the liquid crystal polymer film including two or more fillers having different particle sizes was more preferable (comparison of Examples 1, 8, and 10, and the like).

What is claimed is:

1. A liquid crystal polymer film comprising:
   a liquid crystal polymer; and
   a plurality of fillers,
   wherein, when the fillers are the same, a dielectric loss tangent of each of the fillers under conditions of 25° C. and a frequency of 10 GHz is 0.0020 or less, and when the fillers are different, a mass average value of dielectric loss tangents of the fillers under the conditions of 25° C. and a frequency of 10 GHz is 0.0020 or less, and a ratio of a volume occupied by the fillers to a total volume of the liquid crystal polymer film is 10% by volume or more wherein the fillers are inorganic oxide particle or inorganic nitride particles, and the dielectric loss tangent of each of the fillers or the mass average value of dielectric loss tangents of the fillers is 0.0005 or more lower than a dielectric loss tangent of the liquid crystal polymer.

2. The liquid crystal polymer film according to claim 1, wherein the ratio of the volume occupied by the fillers to the total volume of the liquid crystal polymer film is 30% to 60% by volume.

3. The liquid crystal polymer film according to claim 1, wherein an X-ray diffraction intensity ratio measured by the following method 1 is 1.07 or less,
   method 1: using an X-ray diffractometer, X-rays are incident on a surface of the liquid crystal polymer film from a normal direction, and an X-ray diffraction intensity of 2θ=19° is measured; the X-ray diffraction intensity is measured while rotating the liquid crystal polymer film with the normal direction of the surface of the film as a rotation axis, a minimum value and a maximum value of the X-ray diffraction intensity are obtained from a measurement result obtained by a 360° rotation, and the X-ray diffraction intensity ratio is calculated from a ratio of the maximum value to the minimum value.

4. The liquid crystal polymer film according to claim 2, wherein an X-ray diffraction intensity ratio measured by the following method 1 is 1.07 or less,
   method 1: using an X-ray diffractometer, X-rays are incident on a surface of the liquid crystal polymer film from a normal direction, and an X-ray diffraction intensity of 2θ=19° is measured; the X-ray diffraction intensity is measured while rotating the liquid crystal polymer film with the normal direction of the surface of the film as a rotation axis, a minimum value and a maximum value of the X-ray diffraction intensity are obtained from a measurement result obtained by a 360° rotation, and the X-ray diffraction intensity ratio is calculated from a ratio of the maximum value to the minimum value.

5. The liquid crystal polymer film according to claim 1, wherein the liquid crystal polymer film does not crack in a case where the liquid crystal polymer film is subjected to a bending test by a cylindrical mandrel method using a cylindrical mandrel having a diameter of 8 mm.

6. The liquid crystal polymer film according to claim 1, wherein a thickness of the liquid crystal polymer film is 20 to 200 μm.

7. The liquid crystal polymer film according to claim 1, wherein a median diameter of at least one of the fillers is 0.1 to 10 μm.

8. The liquid crystal polymer film according to claim 1, wherein a shape of at least one of the fillers is spherical or polyhedral, and a sphericity of the at least one of the fillers r is 0.90 or more.

9. The liquid crystal polymer film according to claim 1, wherein the inorganic oxide particles include silica, alumina, magnesium oxide, zirconia or a combination thereof, and the inorganic nitride particles include aluminum nitride, boron nitride or a combination thereof.

10. The liquid crystal polymer film according to claim 1, wherein at least one of the fillers is a filler surface-treated with a silane coupling agent.

11. The liquid crystal polymer film according to claim 1, wherein, in a volume-based particle size distribution of the fillers included in the liquid crystal polymer film, two or more peaks having different particle sizes are exhibited.

12. The liquid crystal polymer film according to claim 1, wherein the dielectric loss tangent of the liquid crystal polymer under the conditions of 25° C. and a frequency of 10 GHz is 0.003 or less.

13. A laminate comprising:

the liquid crystal polymer film according to claim 1; and a metal foil.

* * * * *